United States Patent
Mao et al.

(10) Patent No.: US 7,203,615 B2
(45) Date of Patent: Apr. 10, 2007

(54) SWITCHED FLIGHT TEST INSTALLATION WITH A "PACKET" TYPE DATA FORMAT

(75) Inventors: Jean-Pierre Mao, Toulouse (FR); Jean-Pascal Caturla, Montaigut (FR); Pascale Maether, Pibrac (FR); Nathalie Revaux, Blagnac (FR); Frederic Abadie, Tournefeuille (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/998,948

(22) Filed: Nov. 30, 2004

(65) Prior Publication Data

US 2005/0125182 A1    Jun. 9, 2005

(30) Foreign Application Priority Data

Dec. 3, 2003    (FR) .................................. 03 50960

(51) Int. Cl.
*G06F 19/00* (2006.01)

(52) U.S. Cl. .................. 702/108; 702/114; 702/115; 702/116; 702/117; 702/118; 702/119; 370/392

(58) Field of Classification Search ................ 702/108, 702/114–119; 370/392, 394, 401, 470, 471
See application file for complete search history.

(56) References Cited

U.S. PATENT DOCUMENTS

| | | | |
|---|---|---|---|
| 2,502,215 A | 3/1950 | Giffen et al. | |
| 5,218,863 A | 6/1993 | Mangalam | |
| 6,134,485 A | 10/2000 | Tanielian et al. | |
| 2002/0105958 A1 | 8/2002 | Mao | |
| 2003/0179715 A1 | 9/2003 | Viard et al. | |
| 2004/0114600 A1 | 6/2004 | Mao | |
| 2004/0151118 A1* | 8/2004 | Etienne et al. | 370/235 |

FOREIGN PATENT DOCUMENTS

| | | |
|---|---|---|
| FR | 2 818 066 | 6/2002 |
| FR | 2 837 296 | 9/2003 |

OTHER PUBLICATIONS

Yves Negre, et al., "Digital Telemetry System for Real-Time Analysis of Airbus A320 Flight Test Results", 18th Annual Symposium of the Society of Flight Test Engineers, XP-008032852, 1987, pp. 19-1-19-9.
H. L. Mills, et al., "24-Bit Fligth Test Data Recording Format", International Telemetering Conference, vol. 27, XP-008032841, Nov. 4-7, 1991, pp. 385-389.
Lisa D. Blue, et al., "Development of the Fligth Test Telemetry System for Clipper Graham: A New Way To Do Business", Digital Avionics Systems Conference, XP-010256110, Oct. 26, 1997, pp. 8.1-27 to 8.1-34.

* cited by examiner

*Primary Examiner*—Marc S. Hoff
*Assistant Examiner*—Phuong Huynh
(74) *Attorney, Agent, or Firm*—Oblon, Spivak, McClelland, Maier & Neustadt, P.C.

(57) ABSTRACT

A flight test installation system for collecting aircraft data includes a sensor level configured to convert aircraft physical inputs into plural measurable electrical parameters, an acquisition level configured to perform at least one of an analogue, discrete or digital bus data acquisition to acquire each of the plural measurable electrical parameters, and a concentration level configured to receive data streams from each of the analogue, discrete and digital data buses, and to switch and duplicate frames in the received data streams without modifying a content of the data streams. The flight test installation system also includes a recording and analysis level configured to record and analyze the content of each of the data streams.

11 Claims, 4 Drawing Sheets

SWITCHED FLIGHT TEST INSTALLATION WITH A "PACKET" TYPE DATA FORMAT

TECHNICAL DOMAIN

This invention relates to a switched flight test installation with a "packet" type data format.

STATE OF PRIOR ART

FIG. 1 illustrates a flight test installation (FTI) according to known art that comprises:
- a digital system 10,
- an analogue system 11,
- a time base 12,
- a flight test station 13,
- an alarm and maintenance system 14,
- a telemetry system 15,
- a <<crash>> system 16.

The digital system 10 comprises:

1) firstly, the following connected to FTI inputs No. 1 (Arinc 429 bus, CAN ("Controller Area Network"), RS232, RS422, discrete inputs and measurements varying from DC up to 100 Hz):
- first digital acquisition units (<<Pulse Code Modulation>> number 1) PCM1 20
- second digital acquisition units PCM2 21,
- third digital acquisition units PCM3 22,
- fourth digital acquisition units PCM4 23, connected to two digital recorders 24 and 25, 2) secondly, the following connected to FTI inputs No. 2:
- four digital acquisition units 26 connected to two digital recorders 27 and 28.

The analogue system 11 comprises the following in sequence:
- conditioning units 30 receiving analogue measurements varying from DC up to 20 kHz,
- switching units 31,
- a signal processing unit 32,
- three analogue recorders 33, 34 and 35.

It also comprises a central control unit 37 connected to switching units 31 and the signal processing unit 32.

The time base 12 comprises:
- a GPS (<<Global Positioning System>>) antenna 40,
- a GPS differential trajectography unit 41, comprising a GPS receiver 42 connected to a recorder 43,
- a GPS clock 44,
- a time base generator 45 for dating of all equipment.

The flight test station 13 comprises:
- a display processing unit 50 connected to copiers with paper output 51 and graphic recorders 52,
- a first processing unit 53 connected to a display unit 54 and a keyboard 55,
- a flight conditions processing unit 56 connected to a display unit 57,
- a second processing unit 58 connected to a display unit 59 and to a keyboard 60.

The alarm and maintenance system 14 comprises:
- a central unit 62 connected particularly to the different processing units 50, 53, 56 and 58, a display 63, a keyboard 64, and a printer 65.

The telemetry system 15 comprises:
- a transmitter 70 connected to antennas 71 and 72 aimed at an earth telemetry station.

The crash system 16 comprises the following in sequence:
- a conditioning unit 75,
- a digital acquisition unit 76,
- a recorder 77 that also records the pilot's voice VP.

After more than 20 years of flight tests, this type of flight test installation has been modified to use modified complex architectures built mainly by adding <<bricks>> to existing systems. The reliable way of satisfying new needs in this type of architecture was often to create new acquisition and recording systems. This was the case particularly with the duplication of this flight test installation to make a flight test installation for a new navigation system, or a specific wideband system for analogue measurements up to 20 kHz.

The genuine limitation of such modified architectures is not necessarily the limited throughput, and lies in non-interactivity of the different equipments. It is impossible to merge or exchange data between different systems because the data format is not homogenous, input/output systems operate in <<Half Duplex>> and most connections are point-to-point connections. Furthermore, acquisition systems provide an output link originating from the telemetry domain (pulse code modulation), the principle of which is cyclic transmission of all aircraft parameters at a throughput of about 800 kbits/s.

Therefore, a change is necessary in switching principles for this type of flight test installation to take account mainly of:
- a continuous increase in the number and throughput of observed aircraft parameters,
- the need to share data between the recording systems, flight test processing units, telemetry, etc.,
- the need to merge data originating from different domains, and often from different acquisition systems: standard inputs, wideband analogue inputs, discrete inputs, operation in <<Full Duplex>>, etc.,
- a continuous attempt to reduce costs in aircraft certification, involving the choice of technologies widely used to reduce development and maintenance costs.

As mentioned above, these phenomena have been solved in flight test installations according to known art by duplicating acquisition and recording systems, or using specific installations.

The purpose of the invention is to include multiple environments of such architectures into a single architecture, by physically merging data from any acquisition system towards one or several recording and analysis systems, and standardizing the data format used among all acquisition and operating environments.

PRESENTATION OF THE INVENTION

The invention relates to a switched flight test installation with an architecture based on four data levels:
- a first level, or sensor level, in which data are converted from a physical input magnitude into a measurable electrical parameter magnitude,
- a second level or acquisition level, in which the analogue, discrete or digital bus acquisition is made,
- a third level or concentration level,
- a fourth level or recording and analysis level, characterized in that the third level is a level at which data streams from all second level systems are collected in passing towards fourth level systems, the data not being modified as it passes through this third level, the only functions being switchings and duplications of incident frames.

Advantageously, second level systems perform the following tasks:

for digital inputs: sensor control, analogue filtering, data sampling and analogue-digital conversion, limited mathematical functions, etc.

for digital inputs: label sorts, filtering, for all inputs: marking of time as a function of global synchronization, formatting of data in packets, sorting of packets to their destinations.

Advantageously, third level functions are performed by Ethernet switches. Fourth level systems are onboard systems subscribing to the stream of aircraft parameters such as:

mass data storage for subsequent analysis on the ground, preprocessing by onboard processing units and display for flight test engineers, telemetry.

Advantageously, the installation according to the invention comprises a database containing the configuration of each system, and that manages each system and describes the variation of each aircraft parameter.

Advantageously, a data packet is considered as being the combination of two main optimized structures:

a <<header>> field that contains the necessary data used by the said installation to carry information to the right receivers, a <<parameters>> field that is a set of parameters that the installation produces and transmits to receivers through the network.

This packet also comprises:

an <<end of packet>> field.

Advantageously, the <<header>> field comprises:

1) a <<key>> field that identifies the packet, 2) a <<size>> field that gives the length of the packet, 3) a <<dating>> field that contains the official packet creation time label, 4) a <<status>> field, that comprises:

a key status, an equipment status, 5) a sequence numbers field.

The parameter field may comprise:

a) an identification field that identifies the parameter in a packet, b) a delay field that determines the delay between the packet creation time and the parameter acquisition time, c) a data field dedicated to carrying either an acquired parameter or an internal parameter.

The parameter field may be a <<standard>> type or a <<message>> type.

The parameter field may also comprise:

a) an identification field that identifies a parameter in a packet, b) a length field, that determines the size of the <<message>> type parameter, c) a delay field that gives the time between when a packet is created and when data are acquired, d) a data field dedicated to carrying either an acquired parameter, or an internal parameter.

The flight test installation according to the invention has the following advantages:

excellent flexibility, since any second and fourth level system can be added or removed without any modification other than the wiring and/or configuration of third level switching, data sharing between basic, wideband and crash systems, while architectures according to known art operate independently, central downloading for all second, third and fourth level systems, which reduces the processing time before the flight tests, a cost reduction by including "off the shelf" systems in the flight test environment, a maintenance cost reduction using existing tools, widely used in the networks and telecommunication field.

DETAILED PRESENTATION OF SPECIFIC EMBODIMENTS

Figure 1:
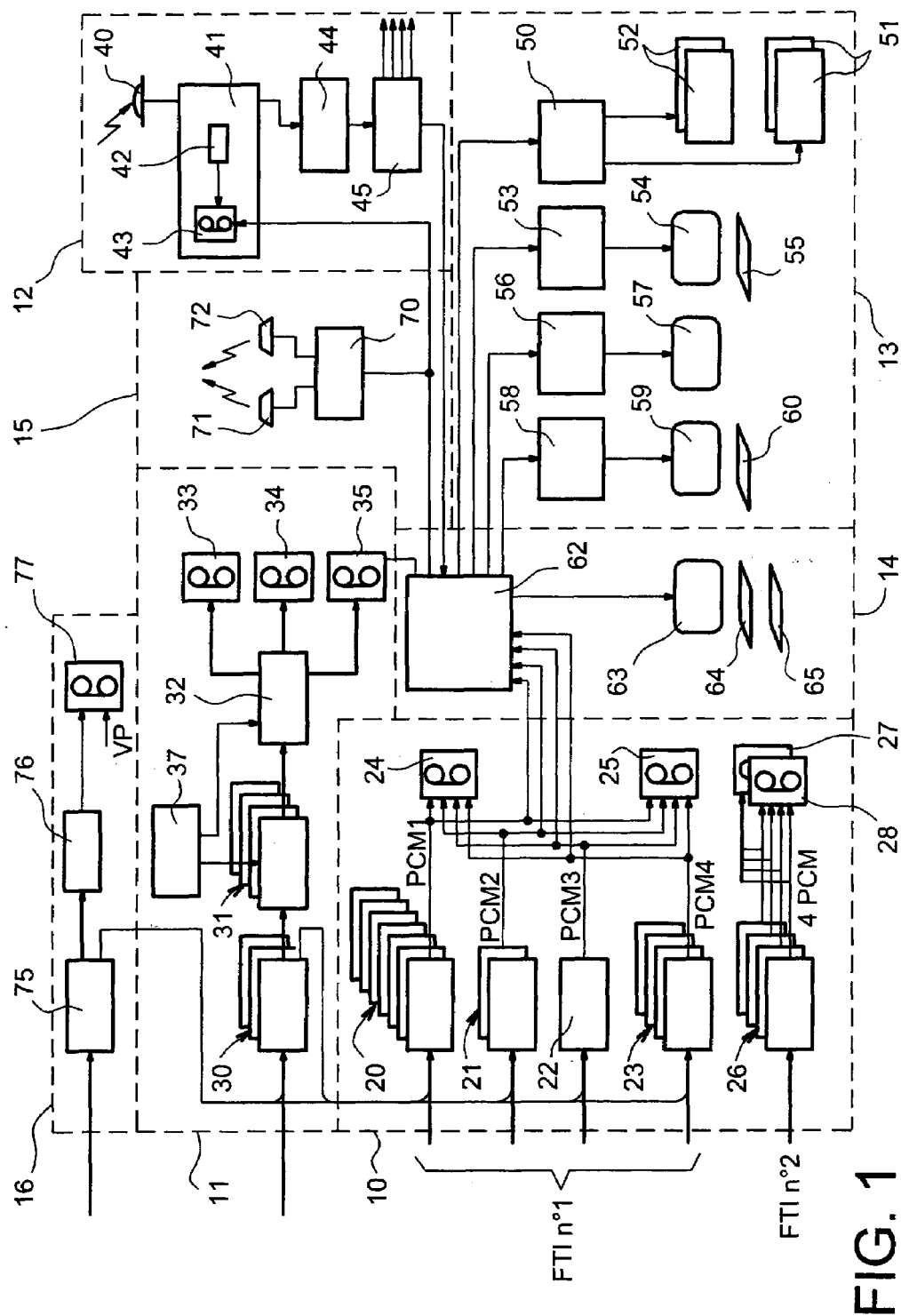
FIG. 1 illustrates a flight test installation according to known art.
Figure 2:
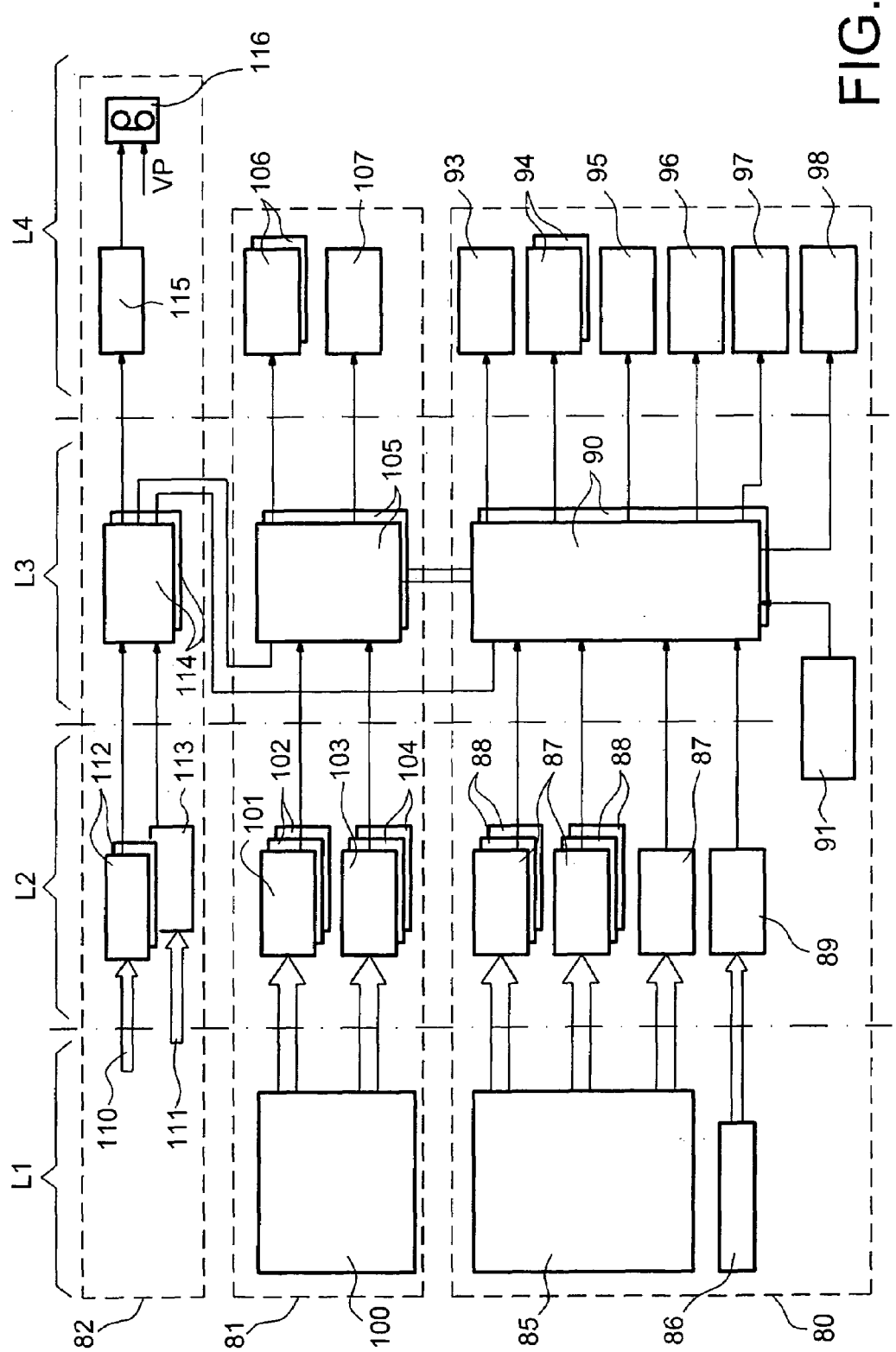
FIG. 2 illustrates the switched flight test installation according to the invention.

As illustrated in FIG. 2, the architecture of the switched flight test installation according to the invention is based on four data processing levels:

a first level (L1), or sensor level, a second level (L2), or acquisition level, a third level (L3), or concentration level, a fourth level (L4), or recording and analysis level.

A physical magnitude (pressure, temperature, force, etc.) is converted into a measurable electrical magnitude (voltage or current) in the first level. Some systems in this level L1 may integrate some second level L2 functions such as filtering, analogue-digital conversion, etc.

Second level systems apply to analogue, digital, discrete acquisition. In particular, these systems perform the following tasks:

for digital inputs: sensor control, analogue filtering, data sampling and analogue-digital conversion, limited mathematical functions, etc., for digital inputs: label sort, filtering, for all inputs: time marking as a function of the global synchronization, data format into packets, sort of packets to their destinations (fourth level groups).

The third level is the level specific to the invention, in which data streams originating from all second level L2 systems towards fourth level L4 systems are collected. No data are modified through this third level. The only functions are switchings and duplications of incident frames that are done by standard Ethernet switches.

Fourth level systems are onboard systems subscribing to the stream of aircraft parameters, such as:

mass data storage for subsequent analysis on the ground, preprocessing by onboard test processing units and display for flight test engineers, telemetry.

A flight test database in which the configuration of each system is stored, manages all systems in the flight test installation. This database describes the variation of each aircraft parameter at the beginning of its life (physical phenomenon) when it is stored in packets.

As illustrated on FIG. 2, the switched flight test installation according to the invention comprises:

a basic system 80, a wideband system 81, a crash system 82.

The basic system 80 comprises:
at the first level L1:
  measurement of parameters in 85,
  the arrival of the <<full duplex>> bus in 86,
in the second level L2:
  first master acquisition units 87 and slave acquisition units 88,
  second acquisition units 89, that are output on Ethernet links,
at the third level L3:
switching units 90 that receive a configuration load 91 and that are output on Ethernet links,
at the fourth level L4:
  a telemetry processor 93,
  mass data recorders 94,
  several processing units 95 to 98.
The wideband system 81 comprises:
at the first level L1:
  the wideband parameter measurement 100,
at the second level L2:
  first master acquisition units 101 and slave acquisition units 102,
  second master acquisition units 103 and slave acquisition units 104,
at the third level L3:
  switching units 105 that are output on Ethernet links,
at the fourth level L4:
  mass data recorders 106,
  a processing unit 107.
The crash system 82 comprises:
at the first level L1:
  measurement of <<crash>> parameters 110,
  arrival of the <<Full Duplex>> bus 111,
at the second level L2:
  first acquisition units 112,
  second acquisition units 113,
at the third level L3:
  switching units 114,
at the fourth level L4:
  an Ethernet/ARINC 573 interface unit 115 connected to a recorder 116 that also receives the pilot's voice VP.

The third level L3 is the genuine communication center of the installation according to the invention. The interconnection between the first and fourth levels is made through a switched Ethernet LAN (<<Local Area Network>>). The switches in this third level L3 are used to transfer data streams from different transmitters to one or several receivers, duplicating them if necessary. These switches thus enable data sharing between the three flight test systems: namely the basic system 80, the wideband system 81 and the crash system 82.

The LAN is built around a 100 Mbit/s Ethernet <<Full Duplex>> architecture using available switches, or COTS (<<Commercial off-the-Shelf>>) Components.

Two operating modes are possible on this network, corresponding to the different data streams:

1) Acquisition Mode

Acquisition mode is the default operating mode. Each system is capable of processing acquired data on start-up.

The main acquisition mode stream consists of packets transporting aircraft parameters, varying from second level units to fourth level units. This traffic is based on a <<multicast>> communication that corresponds to several destinations. This type of <<multicast>> communication enables a second level unit to send data that it acquired to several fourth level units. Point-to-point exchanges in acquisition mode are also done in <<multicast>> switching if necessary.

A <<multicast>> Ethernet addressing plan defines <<multicast destination groups>> that fourth level receivers use in their recordings. These <<multicast>> Ethernet addressees are obtained from a private class D IP sub-network (particular address range), the last byte being the <<multicast>> destination group number.

The <<multicast>> destination groups table is static, identical for all aircraft and is defined exhaustively in the database.

The following table contains an example.

|  | <<Multicast>> destination group number | Corresponding <<multicast>> Ethernet address |
| --- | --- | --- |
| Parameters to level L4 in the basic system | GR10 | 235.1.1.10 |
| Parameters to level L4 in the wideband system | GR20 | 235.1.1.20 |
| Parameters to level L4 in the crash system | GR30 | 235.1.1.30 |
| Parameters to level L4 in the basic system + wideband system | GR12 | 235.1.1.12 |
| Parameters to level L4 in the basic system + crash system | GR13 | 235.1.1.13 |
| Parameters to level L4 in the wideband system + crash system | GR23 | 235.1.1.23 |
| Parameters to level L4 in the basic system + wideband system + crash system | GR123 | 235.1.1.123 |

The third level L3 switching table is then generated automatically as a function of the wiring of receivers on its output ports. This table contains <<Media Access Control>> MAC addresses or <<multicast>> physical addressing, the conversion from IP addresses to MAC addressees complying with the <<multicast>> standard.

2) Download Mode

A system is switched from the second, third and fourth levels in download mode when requested by the user, during operation on the ground. Since all systems operate independently, acquisition and downloading traffic can exit concurrently on the LAN.

The main stream in download mode consists of configuration files originating from a data loader towards each of the second, third and fourth levels. Each system supplier is free to choose his own standard Ethernet protocol for downloading. For example, this may be the TFTP (<<Trivial File Transfer Protocol>>) protocol, the FTP (<<File Transfer Protocol>>) or the TCP (<<Transmission Control Protocol>>)-IP. Multiple download sessions may be supported at the same time.

These exchanges require <<unicast>> addressing (only one destination) which is standard at the Ethernet level, and not <<multicast>> addressing. These Ethernet addressees are taken from a class B Ethernet sub-network (particular address range), the last two bytes being dependent on the aircraft type and number, the type and position of the system. The <<unicast>> addressing table is static for a given aircraft, and is exhaustively defined in the database.

The second, third and fourth level systems may receive the Address Resolution Protocol (ARP) to solve the Ethernet with IP identification in download mode. Each third level switch also uses automatic learning from frames that pass through it, to build up its <<unicast>> MAC switching table.

The following are specific characteristics of the flight test installation according to the invention:

Static <<multicast>> communication: as described above, the LAN is based largely on <<multicast>> addressing that may be found in several industrial applications, but rarely in a static configuration. This avoids dynamic <<multicast>> addressing using an Ethernet group management protocol (<<Internet Group Management Protocol>> or IGMP), using a few second level low level technology systems (no processor or operating system). Static <<multicast>> addressing helps to reduce traffic that reduces the effectiveness of the Ethernet group management protocol, which is always preferable for onboard real time applications such as flight test applications.

Deactivation of dynamic protocols, even if several dynamic protocols are necessary for the LAN to behave correctly, a constant search is carried out to attempt to reduce this type of traffic and thus avoid disturbing transfer of packets. Thus, the Ethernet group management protocol (IGMP), the <<Spanning Tree Protocol>> (STP), private protocols are prohibited in the LAN. The only <<extra>> (non-conventional) protocols supported by the network are the address resolution protocol for download mode and the Ethernet Control Message Protocol (IGMP) used for debugging purposes.

Configuration of the Ethernet address (<<Pin Programming>>): most second level systems include pins on which the address is coded directly, to avoid tedious programming onboard the aircraft. Systems use this programming to be automatically recognized on the LAN, and then to be downloaded through the network.

Network redundancy: classically, the fourth level mass memory in a flight test installation is duplicated to facilitate data analysis and particularly to make the said installation secure. This type of redundancy may easily be extended to the network itself. For example, second and fourth level systems may include redundant Ethernet inputs/outputs. Third level systems may be doubled up: the two third levels thus defined can then support the same switching table, data streams being completely identical on the two networks.

Physical links: the same physical layer is chosen for the LAN. Standard equipment at the third and fourth levels is made specific to support connectors and cables of avionics operating in <<full duplex>>. Therefore, the installation wiring is identical to the wiring in aircraft systems, which facilitates the wiring work in aircraft assembly lines.

Example of Data Packet Format used in the Installation According to the Invention The purpose of this format is to transport all measurements supplied by flight test equipment with precise time labeling and minimum data.

This format is based on the following principles:

the flight test installation according to the invention supplies a unique time base (GPS or internal) for the acquisition and recording systems. All test means (in flight, ground and external) are synchronized with the same time source. A parameter is time dated with the time of its creation, data are processed either continuously (sampling frequency or repetitive cycle), or on an asynchronous event, the same data format is used for test installation means and decoder operating tools.

The different fields in this format will be highlighted below.

Figure 3:
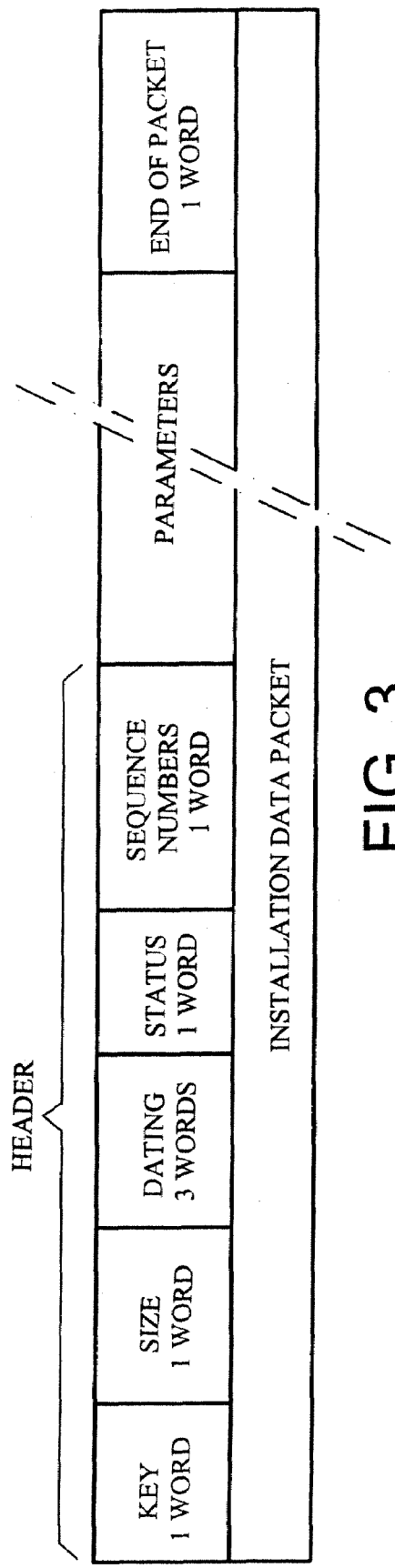
FIGS. 3 to 6 illustrate an example data packet format used in the flight test installation according to the invention.

A data packet may be considered as being a combination of two main optimized structures illustrated on FIG. 3:

a <<header>> field that contains the necessary data used by the flight test installation according to the invention to carry information to the right receivers. These structures are fully described in databases for each equipment. This "header" field contains seven 16-bit words, a <<parameters>> field that is a set of parameters that the system produces and transmits to receivers through the network.

It also comprises:

an <<end of packet>> field: this field is compulsory. The default value given by the database is OXDEAD.

Figure 4:
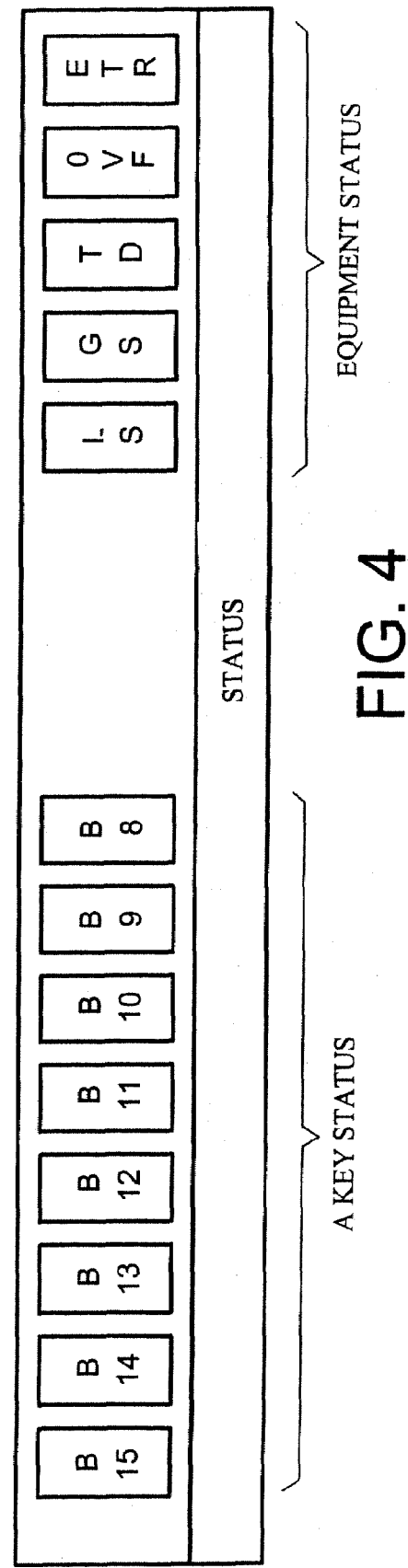

The <<header>> field comprises:

1) a <<key>> field (1 word), that identifies the packet. This field is used to select a group or a family of parameters. A key may thus group analogue parameters (for example temperature, pressure gauge, etc.) with a given sample acquisition frequency, 2) a <<size>> field (1 word), that gives the packet length in a 16-bit word. The size is calculated from the key field to the <<end>> field, 3) a <<dating>> field (3 words), that gives the packet creation date. It represents the number of microseconds from the first of January in the current year, 4) a <<status>> field (1 word), illustrated on FIG. 4 that comprises:

a) a key status, that comprises:

a static key selector B15, for which:

<<1>> means static key,

<<0>> means no static key.

(Static status bits given by a database are fixed by the test equipment. These bits are defined for each key. A static key only contains synchronous parameters (produced with a synchronous sampling frequency). The arrangement in the static key is unchanged).

A parameter selector B14 for onboard processing units, for which:

<<1>> means ignored,

<<0>> means calculated, a message key structure B13, for which:

<<1>> means <<message>> type key structure,

<<0>> means <<standard>> type key structure, a <<delay>> field selector B12, for which:

<<1>> means <<delay >> field used for all parameters carried in a key,

<<0>> means <<delay >> field not used for all parameters carried in a key.

data B11 transmitted by the onboard test computer, for which:

<<1>> means onboard test computer produces parameters for other test equipment,

<<0>> means other cases, a standard key table B10-B8, that gives the size (in word) for all parameters in the key, b) an equipment status, that is updated by the different test means that produce data. It reflects the status of the dedicated key. The meaning of each bit is given below:

ETR represents the status in real time,

OVF indicates an overflow error

TD, for which:

<<0>> means that the parameters are produced by the acquisition systems,

<<1>> means that the parameters are produced by the onboard <<telemetry>> computer.

GS, or the global synchronization status, for which:

<<1>> means synchronization lost,

<<0>> means good synchronization.

LS, or the local synchronization status, for which:

<<1>> means synchronization lost

<<0>> means good synchronization.

5) A <<sequence number>> (<<Seq Num>>) field (1 word): each key has its own sequence number counter that must be incremented before a key is created. This is a circular bit counter 16. This field is checked by all packet decoders to monitor packets lost in the network.

The <<parameters>> field is a set of parameters that a system in the installation produces and transmits to receivers through the network. A parameter is identified by the identification field (ID). It contains useful data or measurements.

A <<standard parameter>> is used to carry analogue, discrete or digital bus parameters.

The <<message parameter>> is used to carry bus frame parameters (RS 232/422/485, ARINC429, AFDX, CAN . . . ).

Figure 5:
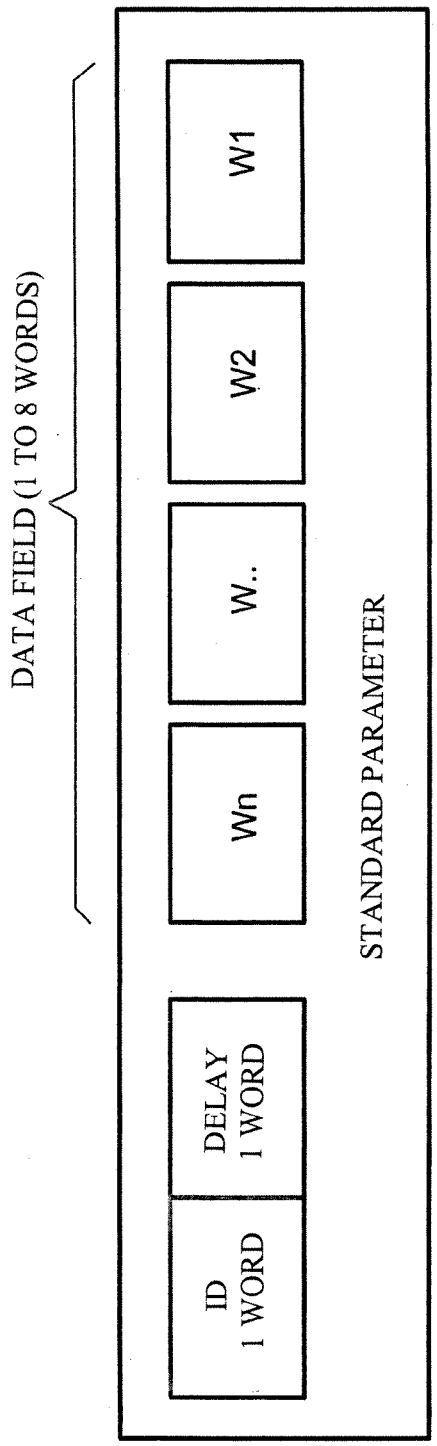
Figure 6:
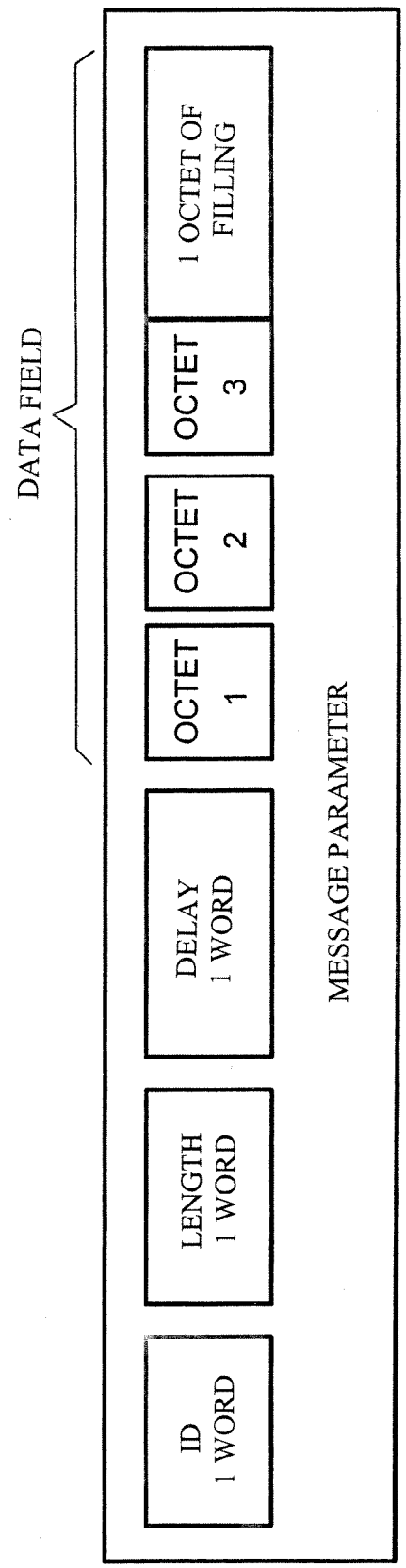

The general standard parameter structure is illustrated on FIG. 5, with:

a) an identification or ID field (1 word) that identifies a parameter in a packet. This is an optional field. This structure is defined by the database. This field is unique in all programming versions of the test installation, b) a delay field (1 word) that determines the delay (in microseconds) between the time at which the packet is created and the time at which the parameter is acquired. Allowable values are between 0 and 65535 µs. The parameter time label is equal to the time at which the packet is created, plus the parameter delay. This is an optional field that is defined by the database.

c) a data field (1 to 8 words) dedicated to carrying either an acquired parameter or an internal parameter. This field is compulsory. The number of words that compose the data is given by the database.

The general structure of the message parameter is given in FIG. 5, with:

a) an identification or ID field (1 word), that identifies a parameter in a packet. This field is compulsory and unique in all programming versions of the test installation, b) a length field (1 word), that determines the size of the data parameter in bytes, not counting the filling byte. This field is compulsory, c) a delay field (1 word), that gives the time between when a packet is created and the acquired data, and which is optional, d) a data field (several bytes), that is dedicated to carrying either an acquired parameter, or an internal parameter. This field is compulsory. All data are justified. A filling byte is added to the end of this field when the length is not aligned on 16 bits.

The invention claimed is:

1. A flight test installation system for collecting aircraft data, the system comprising:
   a sensor level configured to convert aircraft physical inputs into plural measurable electrical parameters;
   an acquisition level configured to perform at least one of an analogue, discrete or digital bus data acquisition to acquire each of the plural measurable electrical parameters;
   a concentration level configured to receive data streams from each of the analogue, discrete and digital data buses, and to switch and duplicate frames in the received data streams without modifying a content of the data streams; and
   a recording and analysis level, configured to record and analyze the content of each of the data streams.

2. The system according to claim 1, wherein the acquisition level is further configured to perform digital input tasks comprising sensor control, analogue filtering, data sampling and analogue-digital conversion, mathematical functions, label sorts, and filtering, and to perform input tasks comprising marking of time as a function of global synchronization, formatting of data in packets, and sorting of packets to their destinations.

3. The system according to claim 1, wherein the concentration level includes Ethernet switches.

4. The system according to claim 1, wherein the recording and analysis level includes onboard systems configured to subscribe to the data streams, the content of the data streams including aircraft parameters and the onboard systems configured to perform mass data storage of the aircraft parameters for subsequent analysis on the ground, preprocessing of the aircraft parameters by onboard processing units for display to flight test engineers, or telemetry of the aircraft parameters.

5. The system according to claim 1 further comprising:
   a database containing configuration information regarding each aircraft system, and configured to manage each aircraft system and describe variations of each aircraft parameter in the content of the data streams.

6. The system according to claim 1, wherein a data packet in the data stream includes a combination of first and second optimized structures:
   the first optimized structure includes a header field having necessary data used to carry information to receivers; and
   the second optimized structure includes a parameters field including a set of parameters transmitted to receivers through the buses.

7. The system according to claim 6, wherein the data packet further comprises:
   an end of packet field.

8. The system according to claim 6, wherein the header field further comprises:
   a key field that identifies the data packet;
   a size field identifying a length of the packet;
   a dating field including an official packet creation time label;
   a status field including a key status and an equipment status; and
   a sequence number field.

9. The system according to claim 6 wherein the parameters field comprises:
   an identification field that identifies a parameter in a packet;

a delay field including information regarding a time between a packet creation time and a parameter acquisition time; and a data field dedicated to carrying either an acquired parameter or an internal parameter.

10. The system according to claim 6, wherein the parameters field comprises:

a identification field that identifies a parameter in a packet;

a length field including information regarding a size of a data parameter;

a delay field including information regarding a time between when a packet creation time and a parameter acquisition time; and a data field dedicated to carrying either an acquired parameter or an internal parameter.

11. The system according to claim 1, wherein the concentration level operates without regard to the content of the data streams.

* * * * *